(12) United States Patent
Yen

(10) Patent No.: US 7,020,208 B1
(45) Date of Patent: Mar. 28, 2006

(54) DIFFERENTIAL CLOCK SIGNALS ENCODED WITH DATA

(75) Inventor: Yao Tung Yen, Cupertino, CA (US)

(73) Assignee: Pericom Semiconductor Corp., San Jose, CA (US)

( * ) Notice: Subject to any disclaimer, the term of this patent is extended or adjusted under 35 U.S.C. 154(b) by 750 days.

(21) Appl. No.: 10/063,621

(22) Filed: May 3, 2002

(51) Int. Cl.
H04B 14/06 (2006.01)

(52) U.S. Cl. .................. 375/244; 375/242; 375/354; 375/357; 375/376

(58) Field of Classification Search ............... 375/219, 375/220, 226, 242, 244, 286, 294, 354, 376, 375/257, 357
See application file for complete search history.

(56) References Cited

U.S. PATENT DOCUMENTS

| | | | | |
|---|---|---|---|---|
| 4,315,308 A | 2/1982 | Jackson | ............. | 364/200 |
| 4,369,516 A | 1/1983 | Byrns | ............. | 375/110 |
| 4,390,963 A | 6/1983 | Puhl et al. | ............. | 364/900 |
| 4,398,265 A | 8/1983 | Puhl et al. | ............. | 364/900 |
| 4,648,102 A | 3/1987 | Riso et al. | ............. | 375/106 |
| 4,654,655 A | 3/1987 | Kowalski | ............. | 340/825.5 |
| 4,755,929 A | 7/1988 | Outous et al. | ............. | 364/200 |
| 4,780,814 A | 10/1988 | Hayek | ............. | 364/200 |
| 5,113,398 A | 5/1992 | Howes | ............. | 371/11.2 |
| 5,172,397 A | 12/1992 | Llewellyn | ............. | 375/110 |
| 5,303,265 A | 4/1994 | Mclean | ............. | 375/17 |
| 5,319,755 A | 6/1994 | Farmwald et al. | ............. | 395/325 |
| 5,446,765 A | 8/1995 | Leger | ............. | 375/359 |
| 5,570,089 A | 10/1996 | Haas | ............. | 341/102 |
| 5,606,717 A | 2/1997 | Farmwald et al. | ............. | 395/856 |
| 5,657,481 A | 8/1997 | Farmwald et al. | ............. | 395/551 |
| 5,751,655 A | 5/1998 | Yamazaki et al. | ............. | 365/233 |
| 5,966,724 A | 10/1999 | Ryan | ............. | 711/105 |
| 6,385,263 B1* | 5/2002 | Bowers et al. | ............. | 375/356 |
| 2002/0130801 A1* | 9/2002 | Scott et al. | ............. | 341/143 |
| 2003/0083024 A1* | 5/2003 | Richenstein et al. | ............. | 455/99 |
| 2003/0198296 A1* | 10/2003 | Bonelli et al. | ............. | 375/257 |
| 2003/0212930 A1* | 11/2003 | Aung et al. | ............. | 714/700 |

* cited by examiner

*Primary Examiner*—Kevin Burd
*Assistant Examiner*—Freshteh N Aghdam
(74) *Attorney, Agent, or Firm*—Stuart T. Auvinen

(57) ABSTRACT

The number of pins on an integrated circuit chip is reduced by encoding control signals into a differential clock. The differential clock has two clock lines with complementary signals that together represent a clock. Control signals inside a clock-transmitting chip are input to an encoder which determines which control signal is being asserted or de-asserted. The encoder drives a clock-control signal that either forces both differential clock lines low or stops the differential clock from pulsing. A clock-receiving chip detects the both-low or stopped differential clock and determines which control signal was asserted or de-asserted. A phase-locked loop (PLL) in the receiver keeps an internal clock running even when the differential clock is missing pulses. A sequence of M1 missing clock pulses, followed by N1 clock pulses, followed by M2 missing pulses encodes the control signal, where M1, N1, and M2 are whole numbers.

12 Claims, 7 Drawing Sheets

DIFFERENTIAL CLOCK SIGNALS ENCODED WITH DATA

BACKGROUND OF INVENTION

This invention relates to integrated circuits, and more particularly to combining control-signal pins with a differential clock.

Many systems include several integrated circuits (ICs) or chips that communicate with one another over signal lines that can include address, data, and control signal lines. Often one or more clock signals are applied to some chips to synchronize signaling. For example, a microprocessor or microcontroller may send address and control signals to a memory, which responds with data. A memory clock can be generated by the microprocessor or by a clock chip and used to synchronize the data transfer.

FIG. 1 illustrates clock and control signals between a pair of chips. Transmitter chip 10 generates control signals A, B, C which are sent to receiver chip 12 to control its operation. A clock generated by clock generator 14 is sent from transmitter chip 10 to receiver chip 12. This clock can be used to synchronize operations such as receiving control and address signals or sending data between chips 10, 12.

The clock signal can be re-synchronized by Phase-locked loop (PLL) 16 in receiver chip 12. Other internal clocks that are synched to the input clock from transmitter chip 10 can be generated by PLL 16. These internal clocks can have different frequencies yet still be synchronized to the input clock.

The control signals A, B, C are often relatively slow signals such as reset, chip-select, mode-select, etc., but can include more-rapidly-changing signals such as byte-enables and masks, strobes and latch signals. For example, when transmitter chip 10 is a microcontroller or a memory controller, and receiver chip 12 is a memory such as a synchronous dynamic-random-access memory (DRAM), control signals can include reset, chip-select, and output-enable. Many other control signals may be included such as data or address strobes and mask signals, as well as an address and data bus.

FIG. 2A shows a pair of chips with a differential clock. As clock speeds increase, traditional full-voltage-swing signaling can limit the clock speed. Reduced-voltage-swing signaling is sometimes used, often with differential signaling rather than using a single clock line.

Clock generator 14 in transmitter chip 10 generates a single-ended clock XCLK, which is input to differential driver 22. Differential driver 22 generates a differential clock that uses a pair of clock lines CK+, CK− that are output to receiver chip 12. The pair of clock lines CK+, CK− change in opposite directions to signal clock transitions.

Lines CK+, CK− are received by differential receiver 24 inside receiver chip 12. A single-ended receive clock RCLK is generated by differential receiver 24. PLL 16 receives RCLK as an input clock and generates internal clock ICLK. Control signals A, B, C can be synchronized to XCLK in transmitter chip 10 and to ICLK in receiver chip 12, as well as other signals (not shown) such as address, data, and strobe signals.

FIG. 2B is a timing diagram highlighting differential clocking of the chips of FIG. 2A. Transmitter-chip clock XCLK in transmitter chip 10 can be a free-running clock that drives the differential driver which generates differential clock signals CK+, CK−. When a positive (rising-edge) transition of XCLK occurs, CK+ rises while CK− falls. For a negative (falling-edge) transition of XCLK occurs, CK+ falls while CK− rises. The amount of voltage change depends on the driver's current drive and the line's termination.

The differential receiver in receiver chip 12 receives CK+, CK− and generates RCLK with a full-voltage swing. The internal PLL retimes RCLK to generate ICLK. ICLK (and other clocks such as XCLK) can be at the same frequency as RCLK, or can be at a different frequency such as half or one-quarter the RCLK frequency, or even a multiple such as double the RCLK frequency. Control signals such as control signal A can be generated by logic driven by XCLK and sampled by latches or logic using ICLK. These control signals are often active for many clock periods.

As memory chips and systems become more complex, more control signals are needed to control the additional operating features. Larger memories also tend to have more address and data signals. The number of pins available in an IC package may be limited, and for cost-reduction reasons the number of pins may be further limited even though larger, more expensive packages could be used. Thus reducing the number of pins on an IC is desirable. The use of differential clocks is desirable to increase clock speed and noise immunity.

DETAILED DESCRIPTION

The present invention relates to an improvement in IC pin reduction. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

The inventor has realized that the number of pins on an IC chip can be reduced by combining control signals with a clock or other periodic signal. The inventor further realizes that control signals can be combined with a pair of differential clock signals. When a differential clock is used, the control signals can be encoded with the clock before the differential driver. This causes the control signal to be encoded into both the positive and negative clock lines, both CK+ and CK−, rather than being encoded into just a single line.

Figure 1:
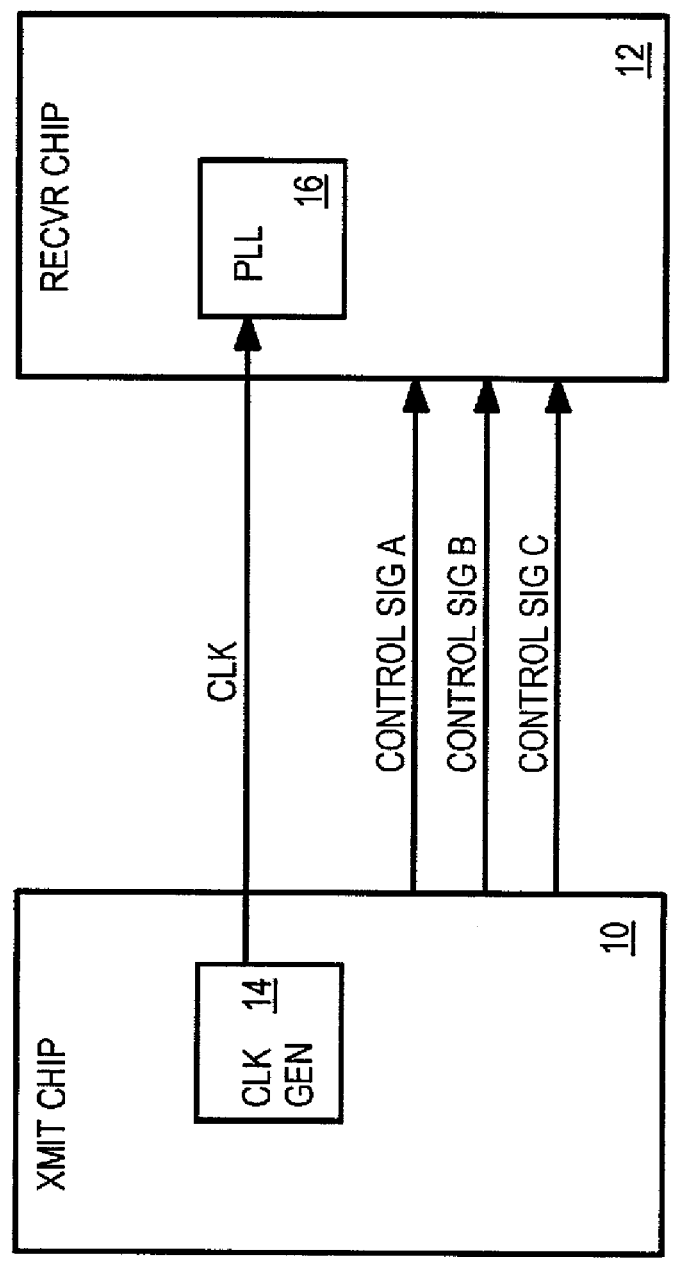
FIG. 1 illustrates clock and control signals between a pair of chips.
Figure 2A:
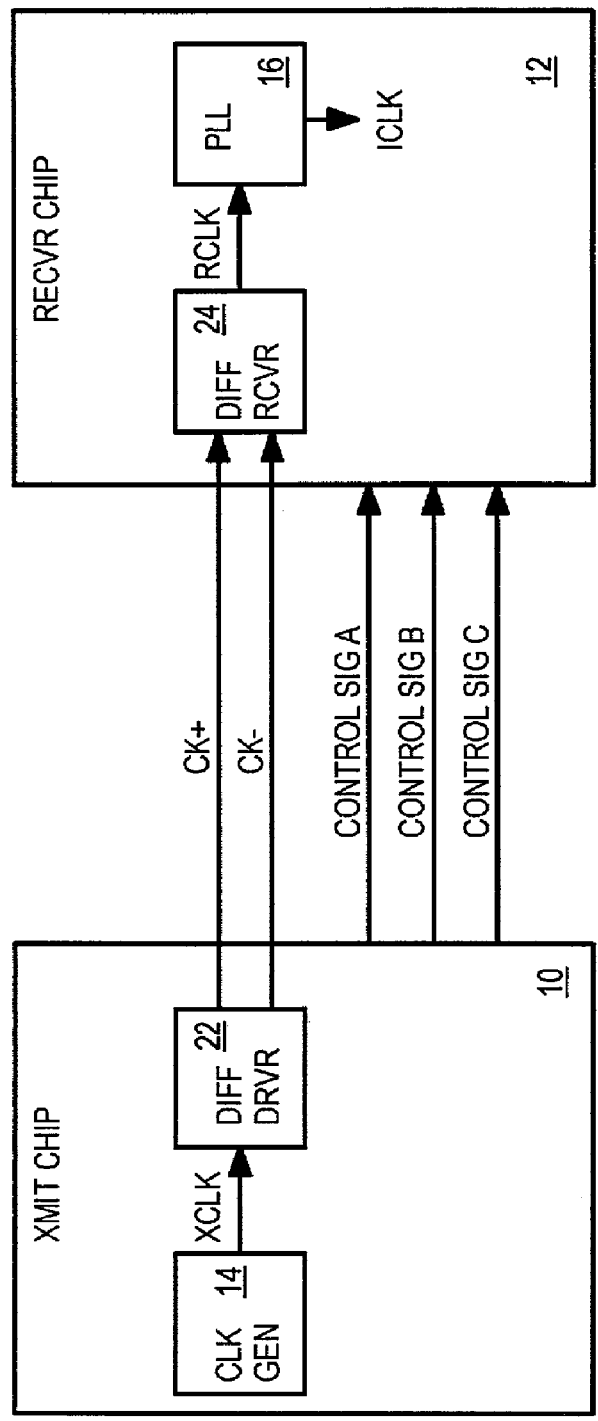
FIG. 2A shows a pair of chips with a differential clock.
Figure 2B:
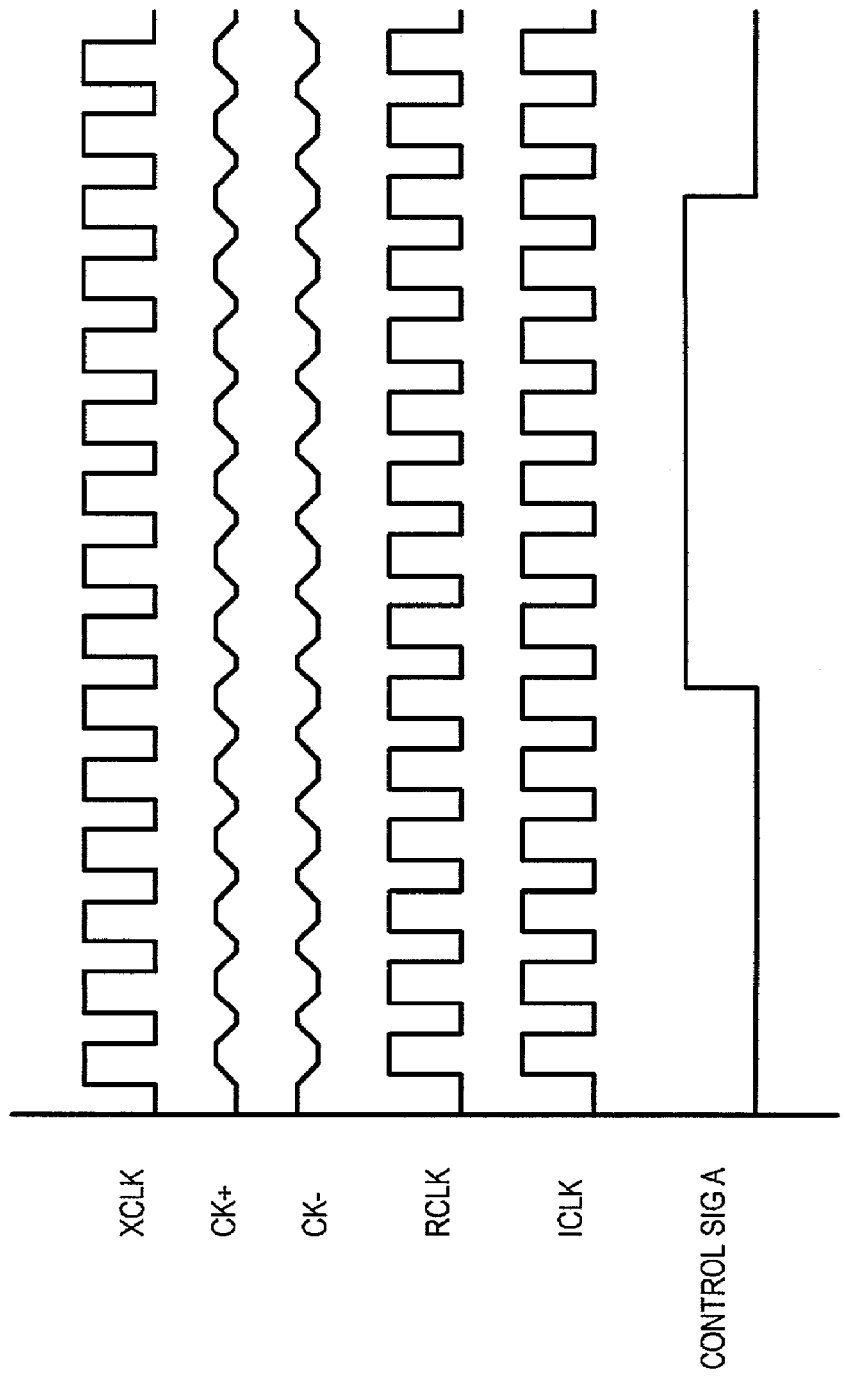
FIG. 2B is a timing diagram highlighting differential clocking of the chips of FIG. 2A.
Figure 3A:
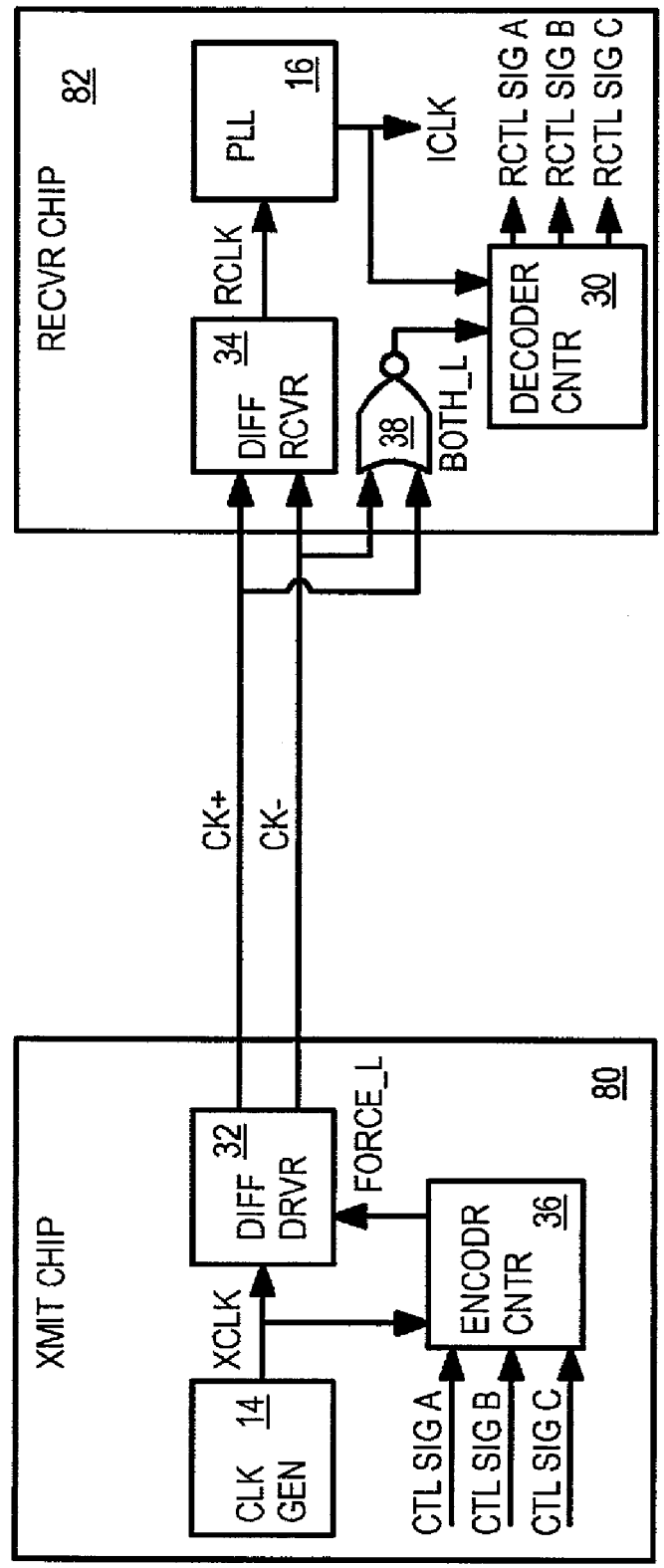
FIG. 3A is a diagram of control signals encoded with a pair of differential clock lines between two chips.

FIG. 3A is a diagram of control signals encoded with a pair of differential clock lines between two chips. Clock generator 14 in transmitter chip 80 can be a PLL or can be a series of buffers that drive internal transmit clock XCLK used by logic in transmitter chip 80. Control signals A, B, C are generated by logic in transmitter chip 80, perhaps by combining external inputs with internal signals or states. Encoder-counter 36 receives control signals A, B, C and transmit clock XCLK and determines when any of the control signals are asserted. When a control signal is asserted, encoder-counter 36 generates a sequence of internal states for a pre-determined number of XCLK pulses. During this sequence, forcing signal FORCE_L is activated at least once.

Forcing signal FORCE_L causes differential drive 32 to alter the differential clock being generated. For example, differential driver 32 normally receives XCLK and generates complementary signals CK+, CK– as the differential clock output to receiver chip 82. However, when FORCE_L is activated, differential driver 32 alters CK+, CK–, such as by forcing both CK+ and CK– low. Differential clock lines CK+, CK– both remain low until encoder-counter 36 de-asserts FORCE_L. Then differential driver 32 resumes normal differential clock generation, driving CK+ high and CK– low with each rising clock edge of XCLK, and driving CK– high and CK+ low for each falling edge of XCLK.

Differential receiver 34 in receiver chip 82 normally receives complementary differential signals on CK+ and CK–, and generates receive clock RCLK which is re-timed by PLL 16 to generate internal clock ICLK. However, when both CK+ and CK– forced low by FORCE_L in transmitter chip 80, NOR gate 38 outputs a high on signal BOTH_L to decoder-counter 30. Decoder-counter 30 also receives internal clock ICLK from PLL 16. PLL 16 can ignore missing clock pulses on RCLK caused by the forced-low encoding since such missing pulses are seen as noise and are filtered out by the filter in the PLL.

Decoder-counter 30 counts the number of clock periods that BOTH_L is asserted high, and determines the sequence and number of forced-low pulses and normal differential-clock pulses. The sequence is compared to pre-defined sequences that correspond to assertion of the different control signals A, B, C. The matching pre-defined sequence indicates which control signal is encoded. Decoder-counter 30 then activates the corresponding control signal, either RCTL_SIG_A, RCTL_SIG_B, or RCTL_SIG_C. The length of time that the control signal is asserted can be pre-defined and does not have to match the assertion time of control signals in transmitter chip 80. Alternately, a second pre-defined sequence can be encoded for de-asserting the control signal.

The pre-defined sequence can be a pattern of missing clock pulses. For example, a pre-defined sequence has M1 missing pulses, then N1 present pulses, then M2 more missing pulses. M1 is the number of missing clock pulses initially detected, N1 is the number of present clock pulses after the M1 missing pulses, but before the next M2 missing pulses, and M2 is the number of missing pulses during the second burst of missing pulses.

The pre-defined sequences can be restricted to having M1 and M2 each be a fixed number of missing pulses, such as 1 or 2. Then the only variable is N1, the number of clock pulses present between the missing pulses. Control signals could be encoded as follows in Table 1:

TABLE 1

| Encoded Signals | | | |
|---|---|---|---|
| M1 | N1 | M2 | Signal Encoded |
| 1 | 2 | 1 | Assert CTL_SIG_A |
| 1 | 3 | 1 | Assert CTL_SIG_B |
| 1 | 4 | 1 | Assert CTL_SIG_C |

Encodings for de-asserting these control signals could use M2=2 missing clocks. Many other encoding schemes can be substituted, such as having N1=1 for control signal A, etc., or having a longer sequence of M1, M2, M3 missing clocks with N1 present clocks between M1 and M2, and N2 present clocks between M2 and M3. A 2-bit binary code using N1 and N2 together could define the encoded signal. Rather than encode signal lines, commands could be encoded, such as when one or more signal lines can carry different commands.

Figure 3B:
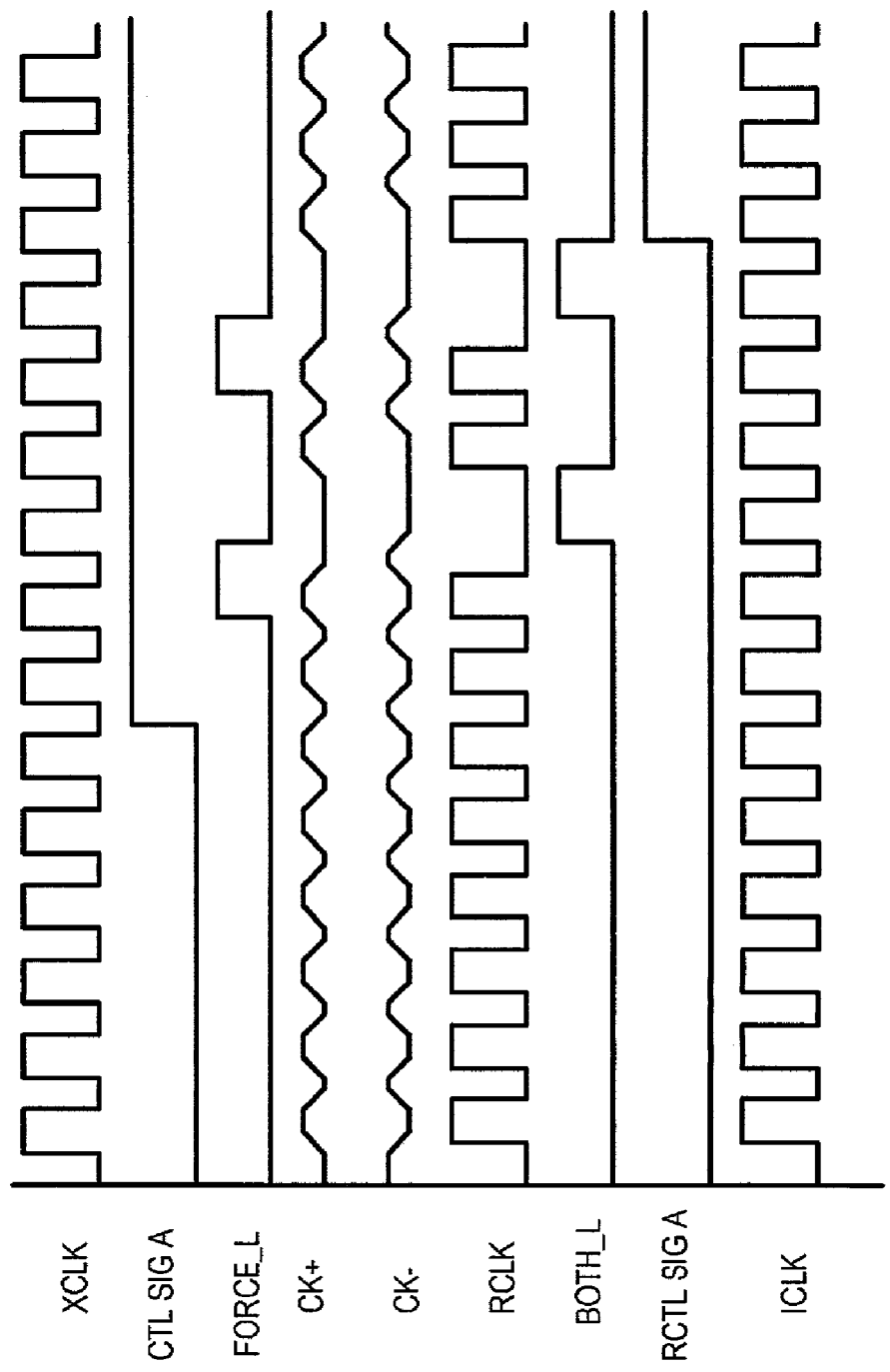
FIG. 3B is a waveform diagram of control-signal encoding over the differential clock lines of FIG. 3A.

FIG. 3B is a waveform diagram of control-signal encoding over the differential clock lines of FIG. 3A. The transmit clock XCLK drives the differential driver in transmitter chip 80, which generates opposite voltage changes in differential clock lines CK+, CK–. For example, when XCLK rises, CK+ rises and CK– falls, and when XCLK falls, CK+ falls but CK– rises. A reduced-voltage swing occurs on CK+, CK–, reducing delays to charge external line capacitances.

The receiver chip receives CK+, CK– and generates receive clock RCLK, which is filtered by a PLL to generate internal clock ICLK. Missing clock pulses on CK+, CK– and RCLK can be tolerated since the PLL includes a filter that can absorb missing pulse and still keep the internal clock ICLK running despite missing input clock pulses. Thus ICLK continues to run even when RCLK has missing pulses.

Control signal A is asserted in the transmitter chip. This signal assertion is detected, and the encoder-counter generates the pre-determined sequence for asserting control signal A. The pre-determined sequence has one missing pulse, followed by 2 present pulses, followed by one missing pulse, or M1=M2=1 and N1=2. Signal FORCE_L is asserted by encoder-counter 36 for one period of XCLK, then de-asserted for 2 periods of XCLK, then asserted again for 1 period of XCLK. A simple state machine or counters can be used by encoder-counter 36 to generate such a pre-defined sequence.

The differential driver responds to FORCE_L by forcing both CK+ and CK– low at the same time. This is normally an illegal condition of the differential signals. When both CK+ and CK– are low, the NOR gate in the receiver chip activates signal BOTH_L to the decoder-counter. The decoder-counter counts the number of internal ICLK pulses that BOTH_L is active and stores this number as M1. Then decoder-counter counts the number of ICLK pulses that BOTH_L is de-asserted (low) and stores this number as N1. Then the decoder-counter counts the number of ICLK pulses that BOTH_L is asserted (high) a second time and stores this number as M2. Finally, the decoder-counter compares M1, N1, M2 to values in a decoding table, or uses decoding logic, to decode the sequence and determine which control signal is asserted or de-asserted. The decoder-counter then asserts the correct signal, RCTL_SIG_A in this example.

Of course, the decoder-counter could be simplified, such as not counting M2 and immediately asserting or de-asserting the decoded control signal once N1 has ended. Decoding logic rather than a decoding table could be used, and a state machine or programmable sequencer could also be employed.

Figure 4A:
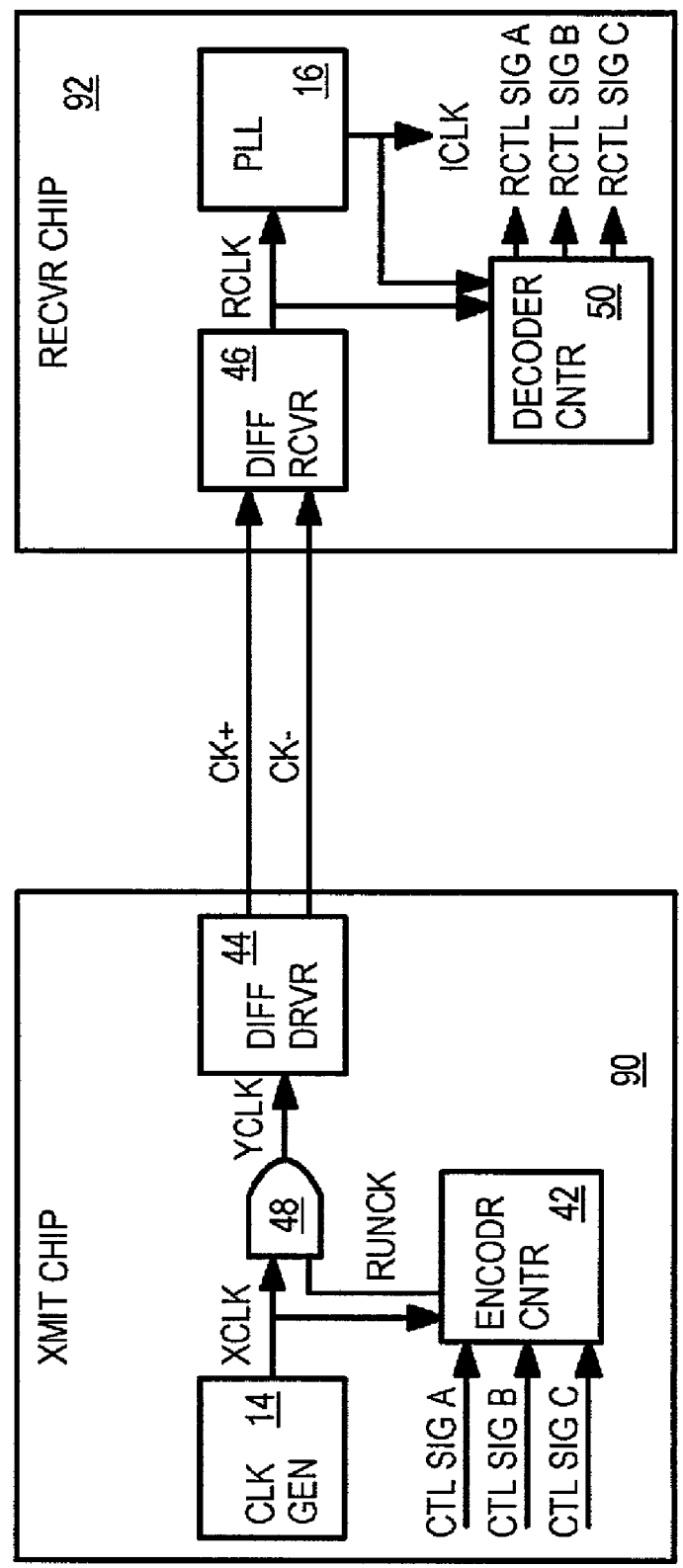
FIG. 4A is a block diagram of an alternate embodiment of encoding control signals over a differential clock.

FIG. 4A is a block diagram of an alternate embodiment of encoding control signals over a differential clock. Rather than detect a double-low condition on the differential clock lines CK+, CK−, the absence of a clock for a period can be detected. The clock can be stopped in either the high or low condition, depending on the particular embodiment.

Clock generator 14 on transmitter chip 90 generates transmit clock XCLK which passes through AND gate 48 before reaching differential driver 44. Differential driver 44 can be a standard single-ended to differential driver that always outputs signals CK+, CK− in opposite states. Signal RUNCK to AND gate 48 is normally high, causing XCLK to pass through to YCLK.

On receiver chip 92, differential receiver 46 is a standard differential receiver that generates receive clock RCLK to PLL 16. PLL 16 generates internal clock ICLK even when a pulse or two is missing from RCLK.

In transmitter chip 90, encoder-counter 42 receives internal control signals CTL_SIG_A, CTL_SIG_B, CTL_SIG_C, and detects when one of these changes state. When a change is detected, encoder-counter 42 determines which pre-defined sequence to generate that corresponds to the control signal assertion or de-assertion. Signal RUNCK is driven low by encoder-counter 42 for a number of XCLK clocks corresponding to M1, then is driven high for a number of XCLKs equal to N1, then driven low again for M2 clocks, and finally driven high.

When RUNCK is low, AND gate 48 forces YCLK low. Differential driver 44 drives CK+ low and CK− high. Rather than changing at the next clock edge of XCLK, CK+ remains low as long as RUNCK is held low by encoder-counter 42. Once RUNCK is driven high, clock pulsing of CK+, CK− resumes.

On receiver chip 92, decoder-counter 50 examines receive clock RCLK and internal clock ICLK and detects when a pulse of RCLK is missing relative to ICLK. PLL 16 keeps ICLK running even when RCLK is missing a few pulses. A filer in PLL 16 drives a voltage-controlled oscillator (VCO) that determines the frequency of ICLK. This filter has a sufficiently large R-C time-constant so that a few missing pulses of the input clock RCLK will not discharge the filter to the point of stopping the VCO oscillation.

Decoder-counter 50 can count the number of missing RCLK pulses to determine M1 and M2, and count the number of RCLK pulses between M1 and M2. These detected values of M1, N1, M2 can be used to decode the control signal that was encoded by the missing differential clock pulses. Decoder-counter 50 then asserts or de-asserts the corresponding internal control signal (RCTL_SIG_A, RCTL_SIG_B, RCTL_SIG_C) in receiver chip 92.

Decoder-counter 50 could use one or more state machines to detect the pre-determined sequences. Alternately, a counter that is reset by RCLK and clocked by ICLK could be used to count M1 and M2. Another counter for N1 could be triggered by the first RCLK pulse after M1. This counter could be read when the next missing pulse at the beginning of M2 is detected.

Figure 4B:
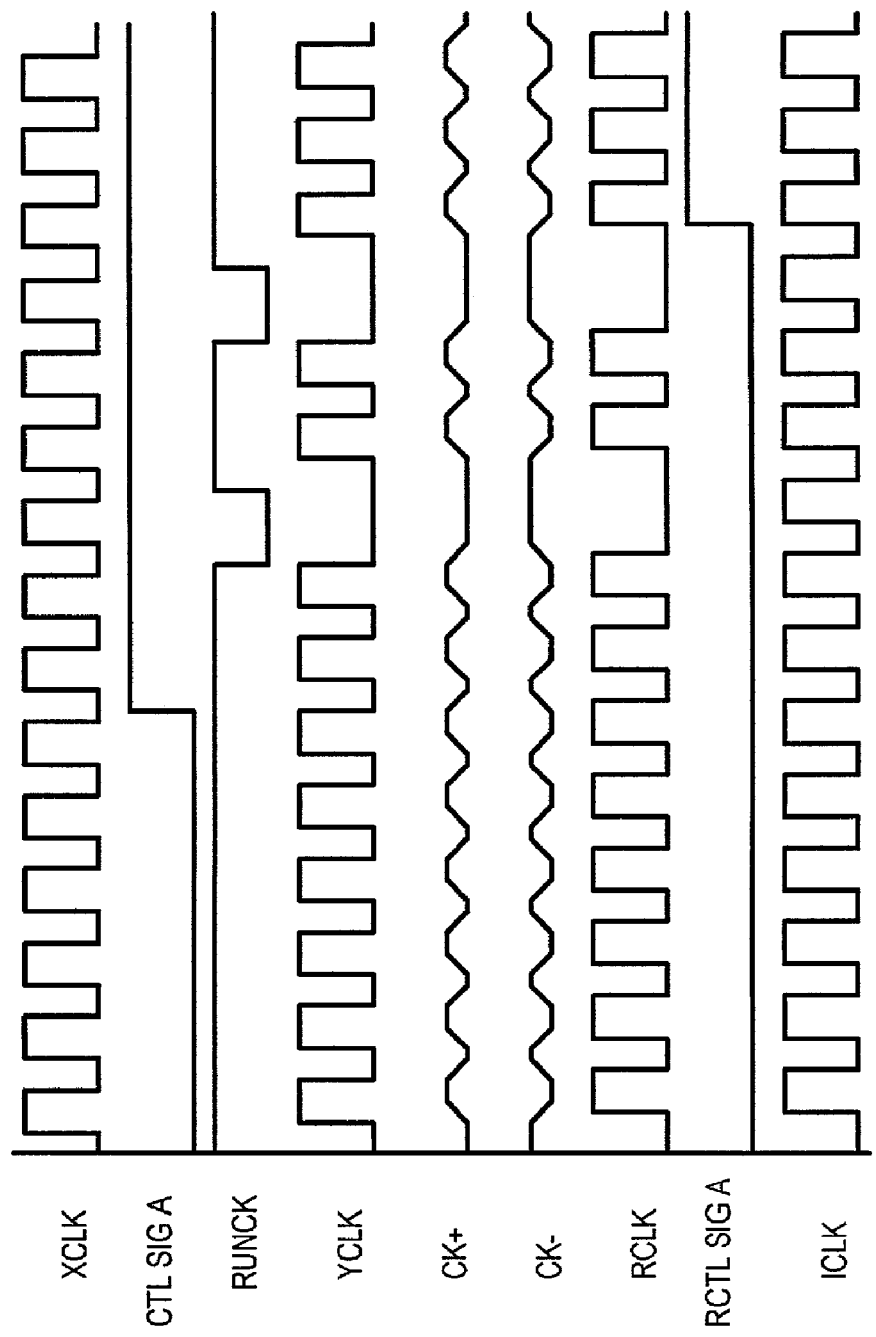
FIG. 4B is a waveform of operation of the differential clock signal encoder and decoder of FIG. 4A.

FIG. 4B is a waveform of operation of the differential clock signal encoder and decoder of FIG. 4A. The transmit clock XCLK drives the differential driver in chip 90, which generates opposite voltage changes in differential clock lines CK+, CK−. When XCLK rises, CK+ rises and CK− falls, and when XCLK falls, CK+ falls but CK− rises. A reduced-voltage swing occurs on CK+, CK−, reducing delays to charge external line capacitances.

The receiver chip receives CK+, CK− and generates receive clock RCLK, which is filtered by a PLL to generate internal clock ICLK. Missing clock pulses on CK+, CK− and RCLK can be tolerated since the PLL includes a filter that can absorb missing pulse and still keep the internal clock ICLK running despite missing input clock pulses. ICLK continues to run even when RCLK has missing pulses.

Control signal A is asserted in the transmitter chip. This signal assertion is detected, and the encoder-counter generates the pre-determined sequence for asserting control signal A. The pre-determined sequence has one missing pulse, followed by 2 present pulses, followed by one missing pulse, or M1=M2=1 and N1=2. Signal RUNCK is driven low by encoder-counter 42 for one period of XCLK, then driven high for 2 periods of XCLK, then driven low again for 1 period of XCLK. A simple state machine or counters can be used by encoder-counter 42 to generate such a pre-defined sequence.

Intermediate clock YCLK is forced low when RUNCK is low. Thus YCLK remains low for one clock period, then pulses twice, and then is low again for one period before resuming normal pulsing. The differential driver responds to this YCLK input by leaving CK+ low and CK− high when YCLK stops.

When CK+ stays low and CK− stays high for a clock period, the decoder-counter detects that a pulse of RCLK is missing relative to ICLK. The decoder-counter counts the number of internal ICLK pulses when RCLK remains low and stores this number as M1. Then decoder-counter counts the number of ICLK pulses that have RCLK pulsing and stores this number as N1. Finally, the decoder-counter counts the number of ICLK pulses that have RCLK remaining low for a second time and stores this number as M2. The decoder-counter compares M1, N1, M2 to values in a decoding table, or uses decoding logic, to decode the sequence and determine which control signal is asserted or de-asserted. The decoder-counter then asserts the correct signal, RCTL_SIG_A in this example.

ALTERNATE EMBODIMENTS

Several other embodiments are contemplated by the inventor. Rather than encoding the control signals with a free-running clock, the control signals could be encoded with other periodic or nearly-periodic signals, such as strobe and handshake signals. When the differential outputs are altered by driving both differential lines to a same state (low-low or high-high), the differential signal does not have to be periodic at all. Internal clocks could be used to time the sequence encoding and decoding on the differential signal lines.

The clock itself may be stopped during power-down modes rather than being free-running at all times. Signals can be asserted high or asserted low, and polarities can be reversed. Two or more than three control signals can be encoded by one differential clock. Control signals can be encoded over several differential signals such as a differential clock and a differential strobe. The control signal may represent commands and themselves contain an encoded command, such as by representing a binary number of a particular command.

Pipelining can be used in the encoders and decoders and clock and driver logic. While detecting pulses has been described, edge detection can also be used. Ripple logic rather than synchronous logic can be used if designed carefully. Polarity can be inverted and logic can be rearranged or added as desired. Clocks and other signals can be buffered and gated. A digital clock generator or digital PLL may be substituted for an analog PLL with a VCO and R-C filter. Digital filtering may be used to filter out missing clock pulses in a digital PLL.

The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. 37 C.F.R. § 1.72(b). Any advantages and benefits described may not apply to all embodiments of the invention. When the word "means" is recited in a claim element, Applicant intends for the claim element to fall under 35 USC § 112, paragraph 6. Often a label of one or more words precedes the word "means". The word or words preceding the word "means" is a label intended to ease referencing of claims elements and is not intended to convey a structural limitation. Such means-plus-function claims are intended to cover not only the structures described herein performing the function and their structural equivalents, but also equivalent structures. For example, although a nail and a screw have different structures, they are equivalent structures since they both perform the function of fastening. Claims that do not use the word means are not intended to fall under 35 USC § 112, paragraph 6. Signals are typically electronic signals, but may be optical signals such as can be carried over a fiber optic line.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

The invention claimed is:

1. An interface between a clock-transmitting chip and a clock-receiving chip comprising:
   a plurality of control signals in the clock-transmitting chip, the plurality of control signals for controlling operation of the clock-receiving chip;
   a plurality of received control signals in the clock-receiving chip, the plurality of received control signals for controlling operation of the clock-receiving chip;
   a transmit clock in the clock-transmitting chip;
   a differential driver in the clock-transmitting chip, receiving the transmit clock and driving a true differential clock line and a complement differential clock line with opposite states during normal operation when the transmit clock is sent from the clock-transmitting chip to the clock-receiving chip over the true and complement differential clock lines;
   a differential receiver in the clock-receiving chip, the differential receiver receiving the true and complement differential clock lines and generating a receive clock;
   an encoder in the clock-transmitting chip that receives the plurality of control signals, for outputting a pre-defined sequence on a blocking signal to the differential driver, the pre-defined sequence indicating a change in one of the plurality of control signals;
   wherein the differential driver alters the true and complement differential lines in the pre-defined sequence to indicate a control signal;
   a decoder, in the clock-receiving chip, for determining the pre-defined sequence when the true and complement differential lines have been altered, and for changing one of the received control signals in the clock-receiving chip that corresponds to the pre-defined sequence; and
   a phase-locked loop (PLL) in the clock-receiving chip that has the receive clock as an input, and outputs an internal clock for use by the clock-receiving chip,
   wherein when the true and complement differential clock lines are altered, causing the receive clock to miss a clock pulse, the PLL continues to pulse the internal clock without missing a clock pulse;
   wherein the pre-defined sequence include a first number of altered clock pulses, followed by a second number of un-altered clock pulses, followed by a third number of altered clock pulses;
   wherein the first, second, and third numbers are at least one;
   whereby changes in the plurality of control signals in the clock-transmitting chip are sent over the true and complement differential clock lines encoded in a pre-defined sequence and whereby alterations to the true and complement differential clock lines are filtered out by the PLL.

2. The interface of claim 1 wherein the pre-defined sequence is one of a plurality of pre-defined sequences each indicating a different change to the plurality of control signals.

3. The interface of claim 2 wherein the first and third numbers are one, while the second number is greater than one;
   wherein the second number is different for each of the plurality of pre-defined sequences, whereby the change in the plurality of control signals is encoded by different second numbers of un-altered clock pulses between altered pulses.

4. The interface of claim 3 further comprising:
   a detect logic gate, in the clock-receiving chip, that receives the true differential clock line and the complement differential clock line and outputs a detect signal to the decoder to indicate when the true and complement differential clock lines are in an altered state;
   wherein the decoder also receives the internal clock from the PLL, the decoder counting a number of internal clock pulses when the detect signal is first activated to determine the first number, and counting a number of internal clock pulses when the detect signal is de-activated before the detect signal is again activated to determine the second number.

5. The interface of claim 4 wherein the altered state is detected when both the true and complement differential clock lines are both in a low state.

6. The interface of claim 4 wherein the altered state is detected when both the true and complement differential clock lines are both in a high state.

7. The interface of claim 2 wherein the differential driver has a blocking logic gate that receives the transmit clock and the blocking signal from the encoder and outputs an intermediate clock to a differential state that generates the true and complement differential clock lines;
   wherein the blocking logic gate stops the intermediate clock from pulsing when the blocking signal is activated by the encoder,
   whereby the true and complement differential clock lines stop pulsing when the blocking signal is activated to alter the true and complement differential clock lines.

8. The interface of claim 7 wherein the decoder receives the receive clock from the differential receiver and receives the internal clock from the PLL;

wherein the decoder counts missing pulses of the receive clock to determine the first number, and counts pulses of the receive clock between missing pulses to determine the second number.

9. The interface of claim 7 wherein the clock-transmitting chip is a memory controller and the clock-receiving chip is a memory.

10. A method for transmitting control information over a pair of differential clock lines comprising:

when no changes occur in control information in a clock-transmitting chip:

applying a pulsing transmit clock signal representing a transmit clock to a differential driver;

generating differential signals changing in opposite directions on the pair of differential clock lines driven by the differential driver to transmit a differential clock to a clock-receiving chip;

generating a receive clock in the clock-receiving chip from the differential clock on the pair of differential clock lines;

when a change occurs to the control information in the clock-transmitting chip;

encoding the change by selecting a selected sequence in a plurality of pre-defined sequences, the selected sequence identifying the change;

altering the differential clock using the selected sequence and transmitting the differential clock with an alteration to the clock-receiving chip;

generating the receive clock in the clock-receiving chip from the differential clock on the pair of differential clock lines, the receive clock having missing pulses when alterations occur;

recovering a free-running internal clock from the receive clock, the internal clock not having missing pulses when the receive clock has missing pulses;

detecting when the differential clock has been altered, and determining a recovered sequence of alterations of the differential clock; and determining a change to received control information in the clock-receiving chip from the recovered sequence;

wherein altering the differential clock using the selected sequence comprises:

altering the differential clock for a period of M1 pulses of the transmit clock;

not altering the differential clock, allowing the differential clock to pulse for a period of N1 pulses of the transmit clock;

altering the differential clock for a period of M2 pulses of the transmit clock;

wherein M1, N1, and M2 are whole numbers;

wherein at least one of M1, N1 and M2 are different for each sequence in the plurality of pre-defined sequences, whereby M1, N1, and M2 together identify the selected sequence and whereby changes to control information are transmitted from the clock-transmitting chip to the clock-receiving chip by encoding alterations to the differential clock.

11. The method of claim 10 wherein altering the differential clock comprises at least one of:

(1) driving both differential signals to a low state rather than to opposite states;

(2) driving both differential signals to a high state rather than to opposite states;

(3) not driving either of the differential signals when the pulsing transmit clock pulses but allowing the differential signals to remain in a previous state.

12. The method of claim 10 wherein the control information indicates a command in a plurality of commands, or indicates states of a plurality of control signals.

* * * * *